United States Patent [19]

Plet

[11] 4,352,242
[45] Oct. 5, 1982

[54] APPARATUS FOR PRODUCING A SKEWERED STACK OF FOOD

[76] Inventor: Catherine Plet, 945 Cordova St., San Diego, Calif. 92107

[21] Appl. No.: 273,585

[22] Filed: Jun. 15, 1981

Related U.S. Application Data

[63] Continuation of Ser. No. 126,976, Mar. 3, 1980, abandoned.

[51] Int. Cl.³ .......................................... B26B 27/00
[52] U.S. Cl. ...................................... 30/130; 17/1 R;
17/15; 30/115; 30/316; 99/450.1; 426/421;
426/518; 425/298; 425/318
[58] Field of Search .................. 17/1 R, 15, 32, 45,
17/52; 426/91, 92, 134, 421, 513, 518; 30/130,
128, 115, 316; 222/386; 99/450.1, 450.4, 450.5,
567; 425/298, 292, 118, 318, 443, 444

[56] References Cited

U.S. PATENT DOCUMENTS

| | | | |
|---|---|---|---|
| 838,230 | 12/1906 | Young | 17/32 |
| 847,244 | 3/1907 | Curtin | 30/115 |
| 968,940 | 8/1910 | Harmison | 30/115 |
| 1,069,509 | 8/1913 | Winn | 17/32 |
| 1,741,682 | 12/1929 | Desmond | 30/130 |
| 1,892,779 | 1/1933 | Cole | 17/32 |
| 1,998,692 | 4/1935 | Van Rossem et al. | 222/386 |
| 2,052,510 | 8/1936 | Woolverton | 17/32 |
| 2,210,765 | 8/1940 | Mahlke | 17/1 R |
| 2,271,908 | 2/1942 | Youngberg | 30/130 |
| 2,310,224 | 2/1943 | Edwards | 30/130 |
| 2,314,401 | 3/1943 | Johnson | 30/130 |
| 2,558,998 | 7/1951 | Yearout | 222/386 |
| 2,609,564 | 9/1952 | Grimm | 17/1 R |
| 2,779,097 | 1/1957 | Frazier | 30/130 |
| 2,821,019 | 1/1958 | Immink | 30/301 |
| 2,837,761 | 6/1958 | Stiegler | 17/32 |
| 3,697,036 | 10/1972 | Kanbar et al. | 17/32 |

*Primary Examiner*—Steven L. Weinstein
*Attorney, Agent, or Firm*—Brown & Martin

[57] ABSTRACT

A gourmet press for producing hors d'oeuvres and similar snacks in the form of morsels of various foods stacked on a skewer. The press is a tubular device with a sharpened end which is pressed into various foods such as cheese, meat, bread, fruit and the like to cut out portions of such foods. Cut portions of food stack successively inside the tube and, when the required stack is complete, a skewer is inserted through the stack. The skewered stack is then ejected by a finger operated plunger mounted in the tube.

1 Claim, 5 Drawing Figures

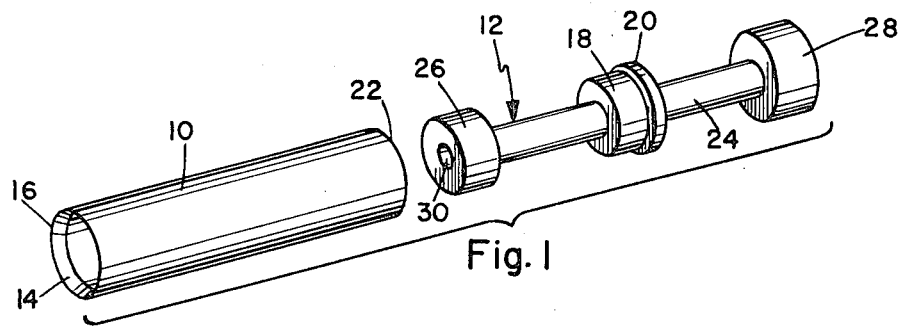
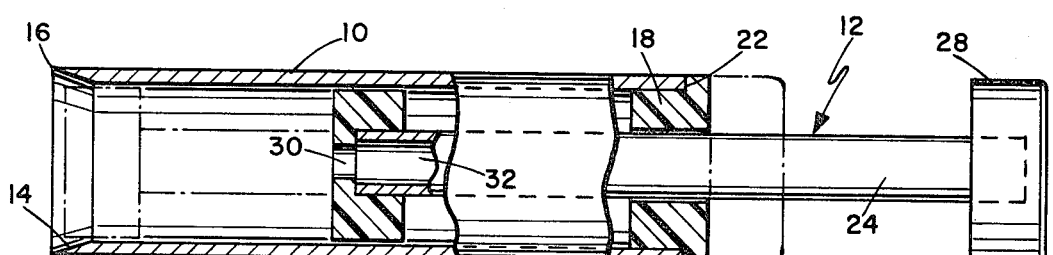
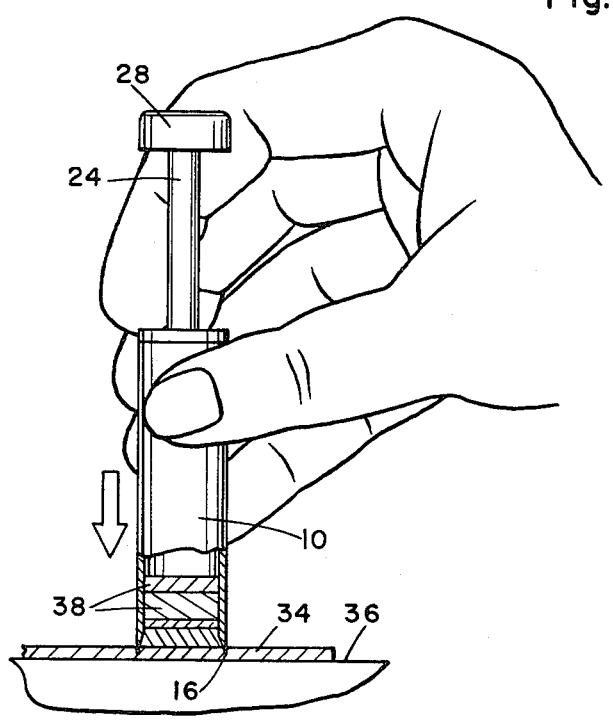
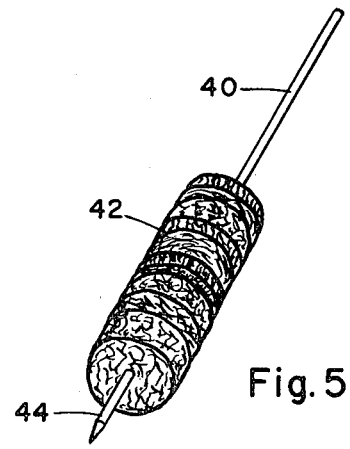
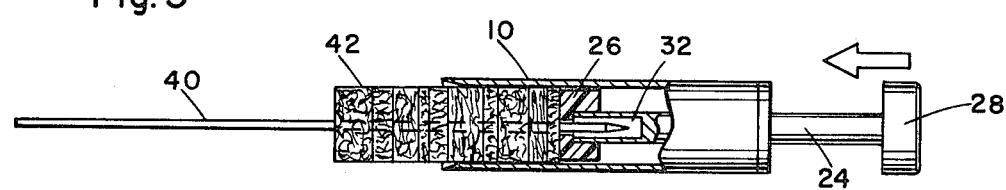

APPARATUS FOR PRODUCING A SKEWERED STACK OF FOOD

This is a continuation of application Ser. No. 126,976 filed Mar. 3, 1980, now abandoned.

BACKGROUND OF THE INVENTION

Hors d' oeuvres and similar small snacks are prepared in a variety of ways, often with morsels of various foods impaled on a toothpick or small skewer for ease of handling. Several different food morsels can be stacked on a skewer for a tasty combination. All of the various food morsels must be cut, chopped, sliced, or otherwise prepared and impaled on the skewers individually. When catering for a large number of people this can be a very time consuming operation, especially when the snacks are to be arranged in artistic displays. It would be a great advantage to individuals and professional caterers to be able to prepare large numbers of such snacks rapidly and of consistent form and attractive appearance.

SUMMARY OF THE INVENTION

The gourmet press described herein enables the user to prepare snacks of various food morsels stacked on a skewer very rapidly and without requiring the user to handle the foods during the operation. The press comprises a simple cylindrical tube with one end sharpened to a peripheral cutting edge. In the other end of the tube is a plug which holds the shaft of a plunger slidably mounted in the tube, the shaft having an external finger actuated knob.

Various foods such as cheese, meat, bread and the like, preferably in sliced form of suitable thicknesses, are placed on a cutting surface. The tube is then pressed into the foods to cut out small portions with the sharpened end, the portions being frictionally retained in the tube. Successive portions of foods stack in the tube until the required arrangement is complete. A skewer is then inserted through the stack, the plunger having a socket to allow the skewer to extend completely through the stack. The resultant snack item is then ejected from the tube by means of the plunger.

The process is very rapid and the user need not handle the foods during the cutting and stacking. Various foods can be assembled in any order to prevent an attractive array of colors and textures, the projecting end of the skewer allows the snack to be mounted on a decorative base or form to make up a display. Also, the extended skewer allows an individual consumer to pick up a grape, cherry, or other such food item which would not be practical to cut and stack in the press. Many different combinations can thus be assembled to suit individual taste.

The primary object of this invention, therefore, is to provide a new and improved gourmet press.

Another object of this invention is to provide a tubular press with a cutting edge for cutting and holding morsels of various foods in a stack within the tube, for ease of mounting on a skewer.

A further object of this invention is to provide a gourmet press having a plunger for ejecting a skewered stack of food morsels from the tube.

Other objects and advantages will be apparent in the following detailed description, taken in conjunction with the accompanying drawing, in which:

FIG. 1 is a perspective view of the separated components of the gourmet press.

FIG. 2 is an enlarged side elevation view of the assembled press, with portions cut away.

FIG. 3 illustrates the use of the press in a cutting action.

FIG. 4 is a side elevation view, partially cut away, illustrating the ejection of a skewered stack of food morsels from the press.

FIG. 5 is a perspective view of a typical snack prepared in the press.

DESCRIPTION OF THE PREFERRED EMBODIMENT

The gourmet press comprises an elongated tube 10 and a plunger assembly 12, which are easily separated for cleaning, as in FIG. 1. Tube 10 is shown as being of circular cross section, but could be of any other convenient shape. One end of tube 10 is internally bevelled at 14 to provide a peripheral cutting edge 16.

The plunger assembly 12 comprises a plug 18 which is a firm but removable fit in the tube 10 and has a flange 20 which seats against the flat end 22 of the tube. A shaft 24 is axially slidably mounted through plug 18 and has a plunger 26 on one end and a knob 28 on the other end. Plunger 26 is a free sliding fit in the tube 10 and has a central opening 30 axially aligned with a socket 32 in the shaft 24.

For ease of maintenance the tube 10 and shaft 24 are preferably of stainless steel, or the like, while the plug 18, plunger 26 and knob 28 are of plastic material such as nylon, which is resistant to chemicals in foodstuffs. The plunger and knob are pressed tightly on the ends of the shaft and may be adhesively or otherwise bonded if necessary. For cleaning the plunger assembly is pulled out of the tube and the parts can be washed in any suitable manner.

The press is used, as illustrated in FIG. 3, by pressing the cutting edge 16 into a food slice 34 on a cutting surface 36. Cut portions 38 of various foods stack in the tube 10 and are frictionally held in place. By bevelling the tube internally to provide the cutting edge, the inside diameter of the tube is slightly smaller than the diameter of the cut piece, which contributes to the holding action. The press is easily held by one hand, as shown, the plunger either being held up by a finger against the knob 28, or allowed to ride up on the food portions as the stack is built. The stack of cut portions is built up as required to form a complete snack. By using foods of various colors, textures and thicknesses, the stack can be made very decorative in appearance as well as appetizing.

When the stack is complete a skewer 40 is pushed axially through the stack. Socket 32 allows the skewer to pass completely through the stack as in FIG. 3, so that the food portions on the end will not fall off. If desired, the opening 30 can be countersunk or outwardly flared to guide the skewer into the socket, but this has not been found to be a problem when using pointed skewers.

The skewered stack of food 42 is ejected from the tube by pressing knob 28 inwardly, so that plunger 26 pushes the stack out. A typical snack is illustrated in FIG. 5, with the various colors and textures of the food portions indicated by different shading.

The operation is very simple and fast, requiring only a few seconds for each snack, and the operator does not handle the food portions. Compared to the usual technique of individually threading morsels of food on a skewer, the process is much more sanitary and less costly. The scraps of foodstuffs left between the cuts can be used in salads, spreads, dips and the like, to minimize wastage.

The projecting end 44 of the skewer 40 enables the snack to be stuck on a base or form in a decorative arrangement, with the stem of the skewer accessible for pick up. One such example uses a conical body of foam plastic with the snacks applied around the body to simulate branches of a tree. Many other arrangements can be made to suit specific occasions or party themes.

A further advantage of the projecting skewer end 44 is that the consumer can pick up an additional food morsel, such as a grape, cherry, or the like which could not be conveniently cut and stacked in the press. This permits a very wide variety of flavor combinations to be made.

It should also be understood that the device can be used to form bite sized individual tubular shaped morsels of various foods to be held on a skewer, such as a piece of bread to be dipped in a fondue, a piece of meat or seafood to be dipped in sauce, cheese bits, and cake or pastry for icing. This avoids the necessity of handling such morsels in preparation and consumption.

Having described my invention, I now claim:

1. A gourmet press for producing skewered stacks of food morsels, comprising:
   an elongated hand-held tube,
   the first end of said tube having an internally bevelled cutting edge for cutting food morsels and facilitating the entry of the cut morsels into the tube,
   a removable plug mountable in the second end of said tube,
   a shaft retained by and axially slideable through said plug, and having its first end insertable into said tube,
   a plunger fixed on the first end of said shaft and slideable within said tube,
   said plunger and shaft being houseable within said tube and plug when said shaft is fully inserted into said tube,
   said plunger having a central opening therein,
   the first end of said shaft having a skewer receiving socket axially aligned with said plunger opening,
   said plunger opening and socket defining a passage for receiving the end of a skewer inserted through the first end of said tube,
   a finger engageable knob fixed on the second end of said shaft, and
   said plug, shaft, plunger and knob comprising a plunger assembly which is removable from said tube to facilitate the cleaning of said press.

* * * * *